(12) United States Patent
Otsubo et al.

(10) Patent No.: US 7,185,488 B2
(45) Date of Patent: Mar. 6, 2007

(54) EXHAUST PURIFYING APPARATUS AND EXHAUST PURIFYING METHOD FOR INTERNAL COMBUSTION ENGINE

(75) Inventors: Yasuhiko Otsubo, Toyota (JP); Masataka Miyazaki, Aichi-ken (JP); Tatsuhisa Yokoi, Toyota (JP); Hiroki Matsuoka, Susono (JP); Shigehiro Matsuno, Toyota (JP); Takayoshi Inaba, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 10/552,588

(22) PCT Filed: Mar. 10, 2005

(86) PCT No.: PCT/JP2005/004731

§ 371 (c)(1),
(2), (4) Date: Oct. 12, 2005

(87) PCT Pub. No.: WO2005/088088

PCT Pub. Date: Sep. 22, 2005

(65) Prior Publication Data

US 2006/0196165 A1    Sep. 7, 2006

(30) Foreign Application Priority Data

Mar. 11, 2004    (JP) ............................. 2004-068988

(51) Int. Cl.
*F01N 3/00*    (2006.01)

(52) U.S. Cl. ............................. 60/295; 60/286; 60/297; 60/311

(58) Field of Classification Search ................. 60/286, 60/295, 297, 303, 311
See application file for complete search history.

(56) References Cited

U.S. PATENT DOCUMENTS

| 4,535,588 | A | * | 8/1985 | Sato et al. ..................... 60/286 |
| 5,193,340 | A | * | 3/1993 | Kamihara ..................... 60/286 |
| 5,207,990 | A | * | 5/1993 | Sekiya et al. ................ 422/183 |
| 5,287,698 | A | * | 2/1994 | Shinzawa et al. ............. 60/286 |
| 5,974,791 | A | * | 11/1999 | Hirota et al. .................. 60/276 |
| 6,594,990 | B2 | * | 7/2003 | Kuenstler et al. ............. 60/295 |
| 6,598,387 | B2 | * | 7/2003 | Carberry et al. .............. 60/297 |
| 6,763,659 | B2 | * | 7/2004 | Watanabe et al. ............. 60/297 |
| 6,915,629 | B2 | * | 7/2005 | Szymkowicz ................ 60/289 |
| 2004/0013579 | A1 | | 1/2004 | Schaller |

FOREIGN PATENT DOCUMENTS

| EP | 1 229 223 A1 | 8/2002 |
| JP | 2002-227688 | 8/2002 |
| JP | 2002-332822 | 11/2002 |
| JP | 2003-020930 | 1/2003 |

* cited by examiner

*Primary Examiner*—Thomas Denion
*Assistant Examiner*—Diem Tran
(74) *Attorney, Agent, or Firm*—Kenyon & Kenyon LLP

(57) ABSTRACT

In an exhaust purifying apparatus, a fuel adding valve (31) supplies unburned fuel to an exhaust passage (14) of a diesel engine (10) so that particulate matter collected in a catalytic converter (33) is burned and removed. The supply of unburned fuel from the fuel adding valve (31) is executed even after an electronic control unit (41) determines that particulate matter in the catalytic converter (33) has been burned and removed. This reduces the amount of particulate matter remaining unburned in the catalytic converter (33).

7 Claims, 4 Drawing Sheets

EXHAUST PURIFYING APPARATUS AND EXHAUST PURIFYING METHOD FOR INTERNAL COMBUSTION ENGINE

This is a 371 national phase application of PCT/JP05/047321 filed 10 Mar. 2005, claiming priority to Japanese Patent Application No. 2004-068988 filed 11 Mar. 2004, the contents of which are incorporated herein by reference.

FIELD OF THE INVENTION

The present invention relates to an exhaust purifying apparatus and an exhaust purifying method for purifying exhaust gas from an internal combustion engine.

BACKGROUND OF THE INVENTION

A typical exhaust purifying apparatus for an internal combustion engine, such as a diesel engine, has a collector in an exhaust passage for collecting particulate matter ("PM") contained in exhaust gas, and performs regeneration control in which collected particulate matter is burned and removed for regenerating the collector. In the regeneration control, the amount of particulate matter collected by the collector (collection amount) is estimated according to the operating condition of the engine. When predetermined regeneration requirements are satisfied, which include the estimated collection amount being no less than a predetermined value, a fuel adding valve, which is provided separately from a fuel injection valve for driving the engine, adds fuel to exhaust gas in a section upstream of the collector. The added fuel is burned at the collector and generates heat. The generated heat increases the temperature of the collector to a temperature that removes particulate matter (about 600° C.). Accordingly, particulate matter is burned and removed so that the collector is regenerated.

For example, Japanese Laid-Open Patent Publication No. 2002-227688 discloses a technology related to such an exhaust purifying apparatus. According to the publication, an exhaust purifying catalyst, such as oxidation catalyst, is provided upstream of a collector. The exhaust air-fuel ratio is repeatedly made rich and lean at an appropriate interval, such that particulate matter is burned and removed.

Other than Japanese Laid-Open Patent Publication No. 2002-227688, Japanese Laid-Open Patent Publications No. 2002-332822 and No. 2003-20930 are also prior art documents related to the present invention.

Unburned fuel tends to be collected on an upstream end of an exhaust purifying catalyst. It is difficult to completely burn the collected unburned fuel, and unburned fuel remains as a deposit. The reason for this is as follows. The temperature distribution of the exhaust purifying catalyst and collector is that the temperature is low at the upstream end of the catalyst and increases toward the downstream end. Therefore, from the point of view that the temperature of the collector should be prevented from exceeding an upper limit value of a temperature range where the collector is capable of collecting particulate matter, the temperature of the exhaust purifying catalyst cannot be increased beyond a certain limitation. The temperature can be increased to a level to burn added fuel, but cannot be increased to a level to burn deposits. Therefore, although added fuel is burned, deposits remain without being burned.

The remaining deposits degrade the reactivity of the exhaust purifying catalyst, and causes particulate matter to remain unburned in the collector. As a result, when the exhaust air-fuel ratio is richened by adding fuel to exhaust gas during the regeneration of the collector, the remaining unburned particulate matter in the collector is burned rapidly. This can excessively increase the temperature of the collector. This problem is also present in a case where an exhaust purifying catalyst is not provided upstream of a collector.

SUMMARY OF THE INVENTION

Accordingly, it is an objective of the present invention to provide an exhaust purifying apparatus and an exhaust purifying method for an internal combustion engine that are capable of reducing the amount of unburned particulate matter in a collector, thereby preventing the temperature of the collector from being excessively increased in a subsequent regeneration.

To achieve the foregoing and other objectives and in accordance with the purpose of the present invention, the invention provides an exhaust purifying apparatus for an internal combustion engine. The apparatus includes a collector, a fuel supplying device, a determining section and a controlling section. The collector is located in an exhaust passage of the internal combustion engine and collects particulate matter in exhaust gas. The fuel supplying device supplies unburned fuel to the exhaust passage to burn and remove particulate matter collected by the collector, thereby regenerating the collector. The determining section determines whether particulate matter in the collector has been burned and removed. The controlling section causes the fuel supplying device to supply unburned fuel to the exhaust passage after the determining section determines that particulate matter in the collector has been burned and removed.

The present invention also provides an exhaust purifying method for an internal combustion engine. The method includes: collecting particulate matter in exhaust gas by a collector located in an exhaust passage of the internal combustion engine; determining whether particulate matter in the collector has been burned and removed; and supplying unburned fuel to the exhaust passage after it is determined that particulate matter in the collector has been burned and removed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
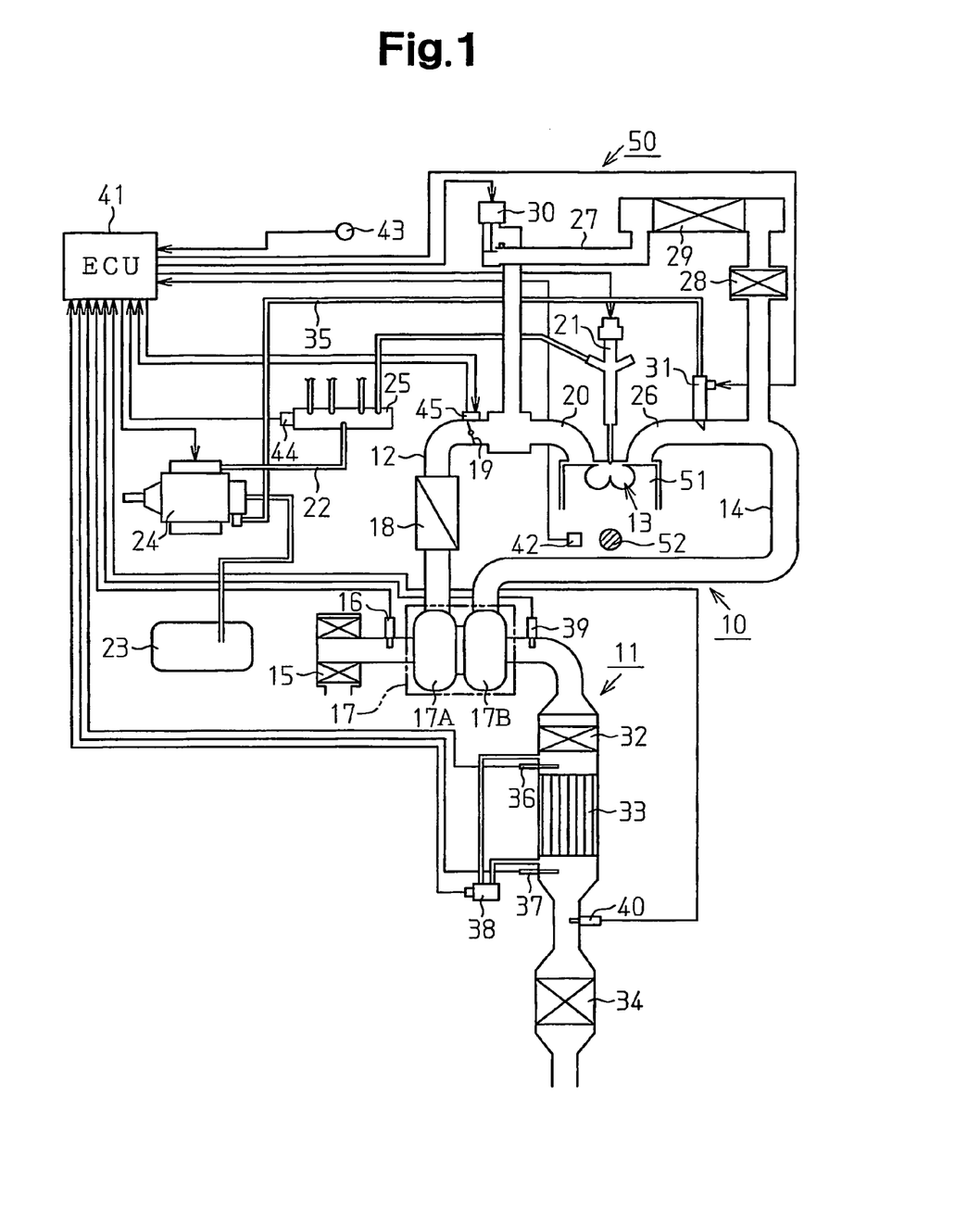
FIG. 1 is a diagram illustrating an exhaust purifying apparatus for an internal combustion engine according to a preferred embodiment of the present invention.
Figure 2:
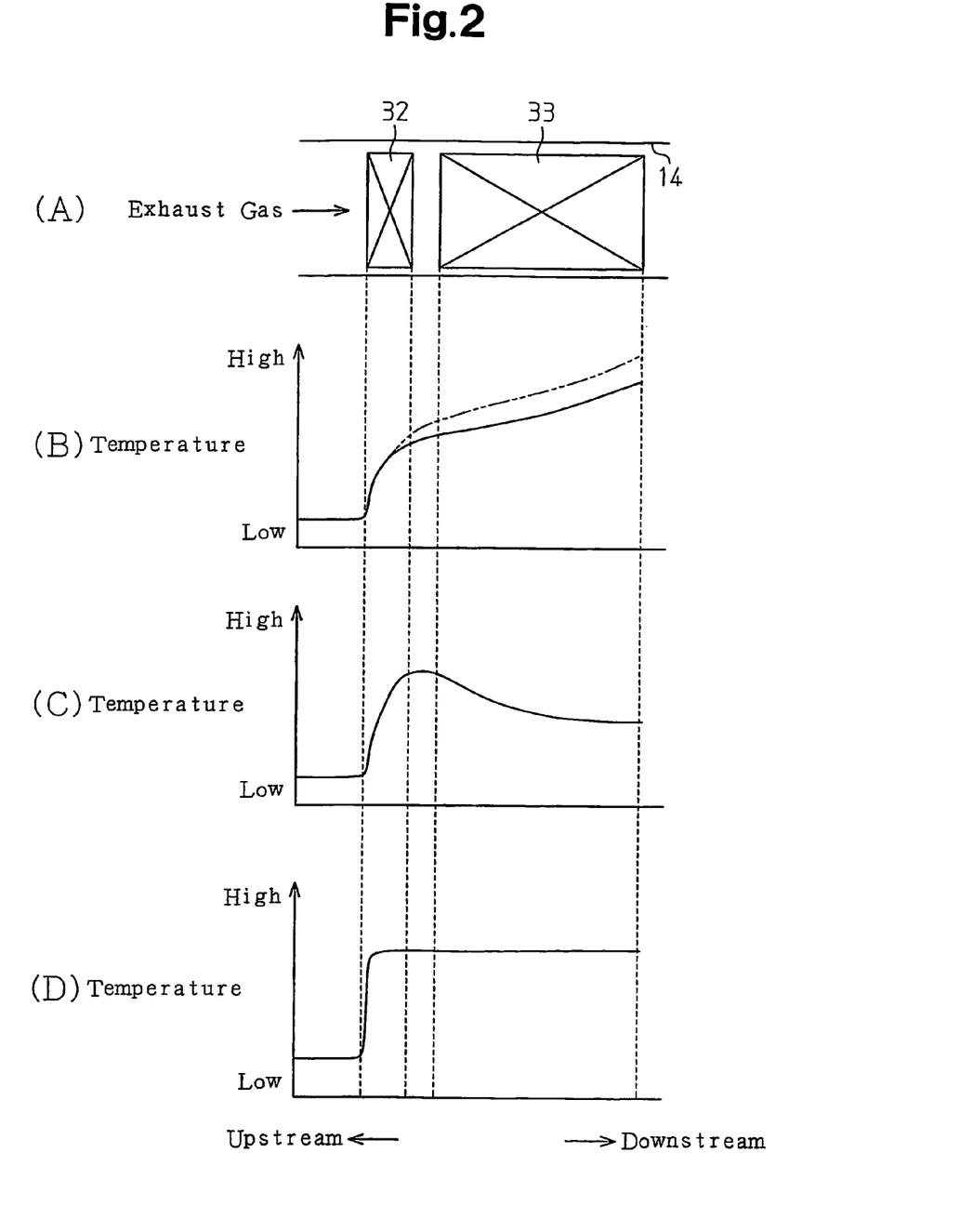
FIG. 2(A) is a diagram showing relative positions of first and second catalytic converters.
FIGS. 2(B) to 2(D) are graphs showing temperature distributions of the catalytic converters.

A preferred embodiment of the present invention will now be described with reference to FIGS. 1 to 4. FIG. 1 illustrates the configuration of an internal combustion engine, which is a diesel engine 10 and an exhaust purifying apparatus 11, to which the present invention is applied. The internal combustion engine 10 includes an intake passage 12, combustion chambers 13, and an exhaust passage 14 as main components. An air cleaner 15 is located in the most upstream section of the intake passage 12. The air cleaner 15 cleans air drawn into the intake passage 12. In the downstream direction from the air cleaner 15, an air flowmeter 16 for detecting the flow rate of air in the intake passage 12, a compressor 17A incorporated in a turbocharger 17, an intercooler 18, and an intake throttle valve 19 are provided in the intake passage 12. The intake passage 12 branches at an intake manifold 20 located downstream of the intake throttle valve 19, and connects to each of the combustion chambers 13 of the engine 10.

A fuel injection valve 21 is provided in each combustion chamber 13 to inject fuel to be combusted in the combustion chamber 13. Each fuel injection valve 21 receives fuel from a fuel tank 23 through a fuel supply line 22. In the fuel supply line 22 are provided a fuel pump 24 and a common rail 25. The fuel pump 24 draws fuel from the fuel tank 23, and then pressurizes and discharges the fuel. The common rail 25 is a high pressure fuel pipe that accumulates highly pressurized fuel. The fuel injection valve 21 of each cylinder is connected to the common rail 25.

On the other hand, in the exhaust passage 14 are provided an exhaust manifold 26 and a turbine 17B of the turbocharger 17. The exhaust manifold 26 collects exhaust gas from the cylinders.

The engine 10 further includes an exhaust gas recirculation (EGR) device 50 for recirculating some of the exhaust gas. The EGR device 50 includes an EGR passage 27 that connects the intake passage 12 with the exhaust passage 14. An upstream section of the EGR passage 27 is connected to a section of the exhaust passage 14 between the exhaust manifold 26 and the turbine 17B. In the EGR passage 27, an EGR cooler catalyst 28, an EGR cooler 29, and an EGR valve 30 are provided in this order from the upstream side. The EGR cooler catalyst 28 purifies recirculated exhaust gas. The EGR cooler 29 cools the recirculated exhaust gas. The EGR valve 30 adjusts the flow rate of recirculated exhaust gas. A downstream section of the EGR passage 27 is connected to a section of the intake passage 12 between the throttle valve 19 and the intake manifold 20.

Air drawn into the intake passage 12 is conducted to the compressor 17A of the turbocharger 17 after being purified by the air cleaner 15. The compressor 17A compresses the conducted air and discharges the compressed air to the intercooler 18. The air, which has been compressed and heated, is cooled by the intercooler 18. Then, the air is distributed to the combustion chambers 13 of the cylinders through the intake throttle valve 19 and the intake manifold 20. The flow rate of air in the intake passage 12 is adjusted by controlling the opening degree of the intake throttle valve 19. The flow rate of air, or intake air flow rate, is detected by the air flowmeter 16.

In each combustion chamber 13, fuel is injected from the associated fuel injection valve 21 during the compression stroke of the cylinder. The air-fuel mixture made of air drawn through the intake passage 12 and fuel injected from the fuel injection valve 21 is combusted in the combustion chamber 13. High temperature and high pressure combustion gas is generated and reciprocates a piston 51. Accordingly, the crankshaft 52, which is an output shaft, is rotated, and driving force (output torque) of the engine 10 is generated. The engine 10 has an NE sensor 42 for detecting engine rotational speed NE, which is rotational speed of the crankshaft 52. The NE sensor 42 includes a rotor attached to the crankshaft 52 and an electromagnetic pickup located near the rotor. The rotor rotates as the crankshaft 52 rotates. As each of projections formed on the circumference of the rotor passes by the pickup, the pickup outputs a pulse signal (NE pulse). The engine rotational speed NE is computed based on the number of NE pulses outputted from the NE sensor per unit time.

Exhaust gas is produced due to combustion in the combustion chambers 13 of the cylinders and guided to the turbine 17B of the turbocharger 17 through the exhaust manifold 26. The stream of the guided exhaust gas drives the turbine 17B, which actuates the compressor 17A provided in the intake passage 12 so that the compressor 17A performs compression of the air described above.

Some of the exhaust gas is guided into the EGR passage 27. Exhaust gas guided into the EGR passage 27 is purified by the EGR cooler catalyst 28 and cooled by the EGR cooler 29. Then, the exhaust gas is recirculated with air in a section of the intake passage 12 downstream of the intake throttle valve 19. The flow rate of recirculated exhaust gas is adjusted by controlling the opening degree of the EGR valve 30.

The engine 10 is configured as described above. The exhaust purifying apparatus 11 for purifying exhaust gas from the engine 10 will now be described. The exhaust purifying apparatus 11 includes a fuel adding valve 31 and three exhaust purifying catalysts, which are three exhaust catalytic converters (first, second, and third catalytic converters 32, 33, and 34). The fuel adding valve 31 functions as a fuel supplying device for supplying unburned fuel to the exhaust passage 14.

The most upstream first catalytic converter 32 corresponds to an exhaust purifying catalyst. The first catalytic converter 32 is located downstream of the turbine 17B and supports a storage-reduction NOx catalyst. The first catalytic converter 32 purifies exhaust gas by occluding nitrogen oxides (NOx) in exhaust gas, and supplying unburned fuel for functioning as a reducing agent, thereby reducing the stored nitrogen oxides (NOx).

The second catalytic converter 33 is located downstream of the first catalytic converter 32. The second catalytic converter 33 functions as a collector for collecting particulate matter in exhaust gas. The second catalytic converter 33 is made of a porous material that permits gaseous components in the exhaust gas to pass through, but blocks particulate matter PM in the exhaust gas. The second catalytic converter 33 supports a storage-reduction NOx catalyst. In this embodiment, the first catalytic converter 32 and the second catalytic converter 33 are formed integrally.

The third catalytic converter 34 is located downstream of the second catalytic converter 33. The third catalytic converter 34 supports an oxidation catalyst, which oxidizes hydrocarbon (HC) and carbon monoxide (CO) in exhaust gas to purify the exhaust gas.

The fuel adding valve 31 is located in a converged section of the exhaust manifold 26. The fuel adding valve 31 is connected to the fuel pump 24 through a fuel passage 35. The fuel adding valve 31 receives fuel from the fuel pump 24 and sprays the fuel, which functions as a reducing agent, into exhaust gas. The added fuel temporarily causes the exhaust gas to be a reducing atmosphere so that nitrogen oxides NOx stored in the first and second catalytic converters 32, 33 are reduced. Simultaneously, particulate matter PM in the second catalytic converter 33 is burned.

An exhaust temperature sensor 36 is located in a section of the exhaust passage 14 between the first catalytic converter 32 and the second catalytic converter 33. The exhaust temperature sensor 36 detects the temperature of exhaust gas passing through the section, or the temperature of exhaust gas that is about to flow into the second catalytic converter 33. Also, an exhaust temperature sensor 37 is located in a section of the exhaust passage 14 downstream of the second catalytic converter 33. The exhaust temperature sensor 37 detects the temperature of exhaust gas passing through the section, or the temperature of exhaust gas that has just passed through the second catalytic converter 33. Further, a pressure difference sensor 38 is connected to the exhaust passage 14. The pressure difference sensor 38 functions as a detecting section for detecting a pressure difference ΔP between the exhaust pressure in a section upstream of the second catalytic converter 33 and the exhaust pressure in a section downstream of the second catalytic converter 33. The pressure difference ΔP detected by the pressure difference sensor 38 is used for detecting clogging in the second catalytic converter 33. Also, oxygen sensors 39, 40 are located in a section of the exhaust passage 14 that is upstream of the first catalytic converter 32 and a section of the exhaust passage 14 between the second catalytic converter 33 and the third catalytic converter 34, respectively. The oxygen sensors 39, 40 each detect the concentration of oxygen in exhaust gas.

The engine 10 and the exhaust purifying apparatus 11, which are described above, are controlled by an electronic control unit (ECU) 41. The electronic control unit 41 includes a CPU that executes various computation processes related to control of the engine 10, a ROM storing programs and data necessary for the control, a RAM for storing the computation results of the CPU, and input and output ports for inputting and outputting signals from and to the outside.

In addition to the above described sensors, the input port of the electronic control unit 41 is connected to an accelerator pedal sensor 43 for detecting the degree of depression of an accelerator pedal, a common rail sensor 44 for detecting the pressure in the common rail 25, and a throttle valve sensor 45 for detecting the opening degree of the intake throttle valve 19.

The output port of the electronic control unit 41 is connected to the intake throttle valve 19, the fuel injection valves 21, the fuel pump 24, the fuel adding valve 31, and the EGR valve 30. Based on detection results from the sensors, the electronic control unit 41 controls the devices connected to the output port, thereby controlling various kinds of operations of the engine 10. The operations include fuel injection timing control and fuel injection amount control by the fuel injection valves 21, and control related to purification of exhaust gas.

As part of the control related to exhaust gas purification, the electronic control unit 41 controls the exhaust purifying catalysts. In this control, four catalyst control modes are used, which are a catalyst regeneration control mode, a sulfur release control mode, a NOx reduction control mode, and a normal control mode. The electronic control unit 41 selects and executes one of the modes that corresponds to the states of the catalytic converters 32 to 34.

In the catalyst regeneration control mode, particulate matter PM collected by the second catalytic converter 33 is burned. The particulate matter is then changed to carbon dioxide and water, and discharged. The catalyst regeneration control mode is started on the condition that at least the weight of particulate matter PM collected by the second catalytic converter 33 (estimated collection amount PMsm) reaches and exceeds a predetermined value (start determination value PMstart), and is ended on the condition that the estimated collection amount PMsm drops to zero or a value close to zero (end determination value PMend).

The estimated collection amount PMsm is computed using the following formula (1) in another process.

$$PMsm \leftarrow Max\ [PMsm+PMe-PMc,\ ``0"] \quad (1)$$

The estimated collection amount PMsm on the right side of the formula (1) is a value of the amount PMsm that has been computed in the previous execution.

PMe represents the amount of particulate matter PM discharged from all the combustion chambers 13 of the engine 10 in a single execution, or engine discharging amount. For example, the engine discharging amount PMe is computed based on a prestored map defining the relationship of the engine discharging amount PMe with the engine rotational speed NE and the load (in this embodiment, the fuel injection amount from the fuel injection valves 21).

PMc represents the amount of particulate matter oxidized in the second catalytic converter 33 during a period of a single execution, or oxidation amount. For example, the oxidation amount PMc is computed based on a map defining the relationship of the oxidation amount PMc with the catalyst bed temperature of the second catalytic converter 33 (in this embodiment, the exhaust temperature detected by the exhaust temperature sensor 37) and an intake air amount GA.

Max on the right side is an operator for extracting the greatest value from the values in the following parentheses. Therefore, if "PMsm+PMe−PMc" has a positive value, it is used as the estimated collection amount PMsm. If "PMsm+PMe−PMc" has a negative value, zero is used as the estimated collection amount PMsm. The process of the electronic control unit 41 to compute the estimated collection amount PMsm corresponds to a process executed by an estimating section, which estimates the amount of particulate matter in the collector according to the operating condition of the engine 10.

When the catalyst regeneration control mode is selected, fuel addition from the fuel adding valve 31 is repeated in a state where the air-fuel ratio is higher than the stoichiometric air-fuel ratio, so that the catalyst temperature (catalyst bed temperature) is increased (600 to 700° C.). This process is referred to as a normal catalyst regeneration, so that it is distinguished from burn-up catalyst regeneration, which will be discussed below.

If particulate matter PM is burned and removed by supplying unburned fuel based on the estimated collection amount PMsm, the estimated collection amount PMsm having a value less than the actual collection amount can prevent the particulate matter PM from being completely burned, and cause some of the particulate matter PM to remain unburned. One of the reasons why such deviation occurs is collection of unburned fuel in the upstream end of the first catalytic converter 32. Since it is difficult to completely burn the collected unburned fuel, some unburned fuel remains as deposits. The reason for this is as follows. As indicated by the solid line in FIG. 2(B), the temperature distribution of the first and second catalytic converters 32, 33 arranged as shown in FIG. 2(A) is that the temperature increases toward the downstream side. Therefore, from the point of view that the temperature of the second catalytic converter 33 should be prevented from exceeding an upper limit value of a temperature range where the second catalytic converter 33 is capable of collecting particulate matter, the temperature of the upstream end of the first catalytic converter 32 cannot be increased beyond a certain limitation. The temperature can be increased to a level to burn added fuel, but cannot be increased to a level to burn deposits. Therefore, although added fuel is burned, deposits remain without being burned.

The deposits cause particulate matter PM to remain unburned in the second catalytic converter 33, which causes the estimated collection amount PMsm to deviate from the actual collection amount. It is thus important to remove the deposits. To burn and remove the deposit, it is effective to increase the temperature of the upstream end of the first catalytic converter 32. However, as indicated by alternate long and two short-dashes line in FIG. 2(B), although simply increasing the supply amount of unburned fuel increases the temperature at the upstream end of the first catalytic converter 32, the temperature of the second catalytic converter 33 is also increased. This can excessively increase the temperature in the downstream section of the second catalytic converter 33. Therefore, this method is not practical.

In contrast to this, unburned fuel is supplied (intermittent addition) to the exhaust passage 14 in this embodiment even after it is determined that particulate matter PM in the second catalytic converter 33 has been burned and removed by the normal catalyst regeneration. This completely burns and removes particulate matter PM that remains unburned. A process for completely burning particulate matter PM is referred to as burn-up (BU) catalyst regeneration.

In burn-up catalyst regeneration, a fuel supply cycle is executed, which includes a supplying period for supplying fuel and a stopping or resting period in which the fuel supply is stopped. Accordingly, the fuel adding valve 31 is controlled to intermittently supply unburned fuel to the exhaust passage 14. This intermittent addition of fuel permits a process to be repeatedly executed in which the air-fuel ratio is set to the stoichiometric air-fuel ratio or an air-fuel ratio slightly less than the stoichiometric air-fuel ratio with a period where no fuel addition is performed between the executions. In this embodiment, the air-fuel ratio is richened to be a value slightly less than the stoichiometric air-fuel ratio.

Unburned fuel supplied during the supplying period in an initial fuel supplying cycle is burned and generates heat. The heat is used to increase the temperature in the upstream end of the first catalytic converter 32, which correspondingly delays a temperature increase in the second catalytic converter 33. Accordingly, as shown FIG. 2(C), a state temporarily occurs in which the temperature of the first catalytic converter 32 is higher than the temperature of the second catalytic converter 33. In general, continuous supply of unburned fuel in a state where a great amount of particulate matter PM remains brings about a temperature distribution in which the temperature is higher toward the downstream end. However, in this embodiment, since the fuel supply cycle is repeated, the temperature distribution of the first and second catalytic converters 32, 33 will be as shown in FIG. 2(D). That is, the temperature is about the same at any position from the upstream end to the downstream end.

The burn-up catalyst regeneration includes two modes: a first burn-up catalyst regeneration and a second burn-up catalyst regeneration. In the first burn-up catalyst regeneration, the estimated collection amount PMsm is corrected, so that the amount of supplied unburned fuel is slightly more than the amount required for completely burning particulate matter PM remaining unburned in the second catalytic converter 33. In contrast, in the second burn-up catalyst regeneration, a predetermined amount of unburned fuel is supplied regardless of the amount of particulate matter PM remaining unburned in the second catalytic converter 33. In one catalyst regeneration mode, one of the first and second burn-up catalyst regenerations is performed. Which of the regenerations should be executed is determined based on the pressure difference $\Delta P$ between the exhaust pressure upstream of the second catalytic converter 33 and the exhaust pressure downstream of the second catalytic converter 33 in the exhaust passage 14. When the pressure difference $\Delta P$ is more than or equal to a predetermined value (determination value Dp), it is assumed that a relatively great amount of particulate matter PM remains unburned in the second catalytic converter 33 so that pressure loss is great. In contrast, when the pressure difference $\Delta P$ is less than the determination value Dp, it is assumed that a relatively small amount of particulate matter PM remains unburned in the second catalytic converter 33 so that pressure loss is small. In the former case, the first burn-up catalyst regeneration is executed. In the latter case, the second burn-up catalyst regeneration is executed.

The sulfur release control mode refers to a mode in which sulfur oxides SOx are released from the first and second catalytic converters 32, 33 when the NOx storage-reduction catalysts in the catalytic converters 32, 33 are poisoned with sulfur oxides SOx and the NOx storing capacity is lowered.

The NOx reduction control mode refers to a mode in which nitrogen oxides NOx stored in the NOx storage-reduction catalysts in the first and second catalytic converters 32, 33 are reduced to nitrogen $N_2$, carbon dioxide $CO_2$, and water $H_2O$ and released. In this mode, fuel addition from the fuel adding valve 31 is performed at a relatively long interval, so that the catalyst temperature becomes relative low (for example, 250 to 500° C.). A state where none of the catalyst regeneration control mode, the sulfur release control mode, and NOx reduction control mode is being executed corresponds to the normal control mode, in which the fuel adding valve 31 does not add reducing agent to exhaust gas.

Figure 3:
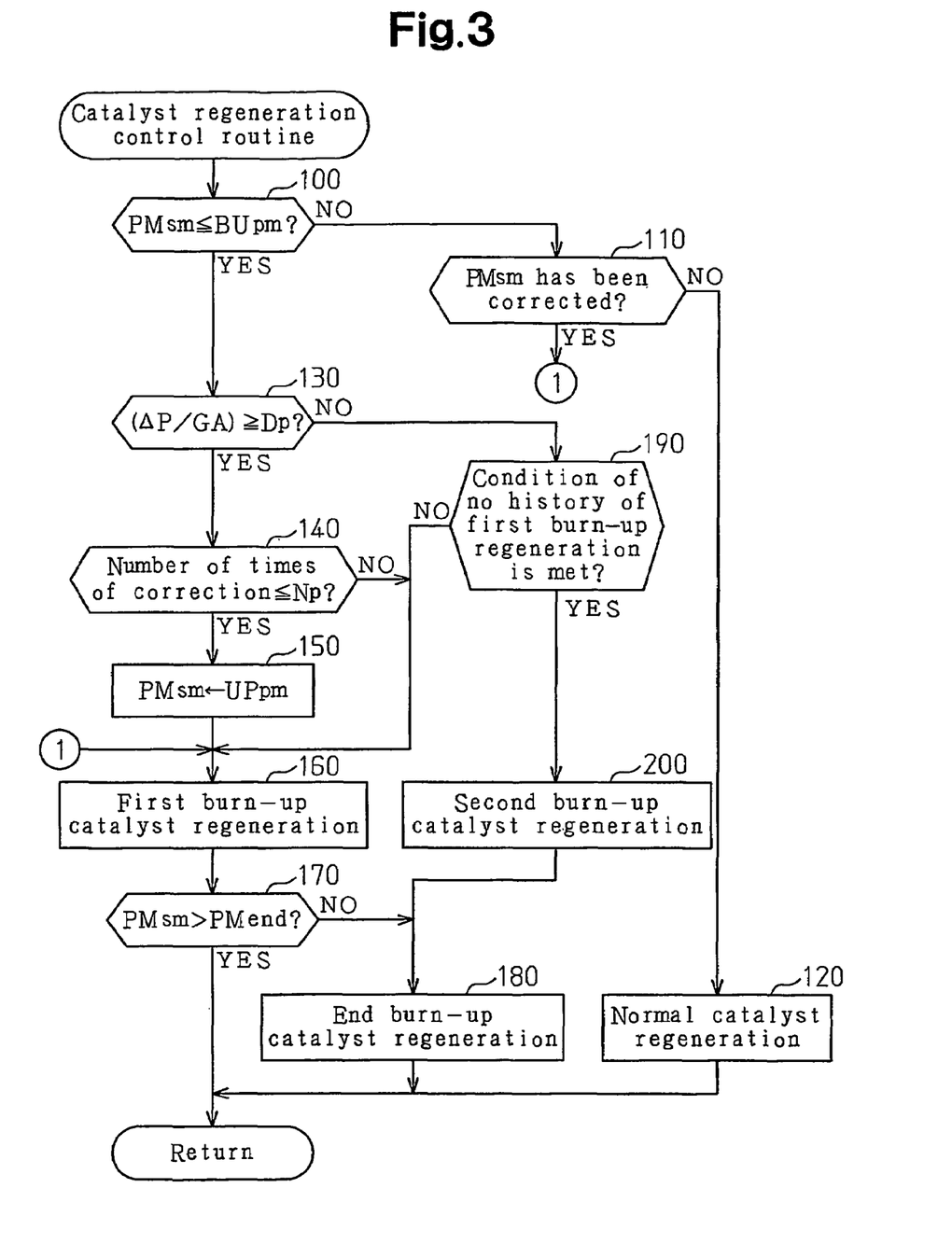
FIG. 3 is a flowchart showing a catalyst regeneration control routine.

Operations in the preferred embodiment formed as described above will now be described. The flowchart of FIG. 3 shows one of the processes executed by the electronic control unit 41. Specifically, FIG. 3 shows a catalyst regeneration control routine that is executed after the normal catalyst regeneration has been started in the catalyst regeneration control mode.

In the catalyst regeneration control routine, the electronic control unit 41 determines at step 100 whether the requirement for shifting from the normal catalyst regeneration to the burn-up catalyst regeneration is satisfied. The requirement is that "the estimated collection amount PMsm is no more than a shifting determination value BUpm." The shifting determination value BUpm is sufficiently less than the start determination value PMstart and slightly more than the end determination value PMend. The shifting determination value BUpm is set to, for example, 0.35 g.

Put in different terms, step 100 is a step for determining based on the estimated collection amount PMsm whether now is the time at which or time immediately before the burning and removal of particulate matter by the normal catalyst regeneration is ended. As the accumulation of the particulate matter PM progresses in the second catalytic converter 33, the collection amount increases, and as the burning and removal of particulate matter PM progress, the collection amount decreases. When the collection amount becomes zero or a value close to zero (positive outcome at step 100), it is determined that the particulate matter PM collected by the second catalytic converter 33 has been completely, or nearly completely, burned.

If the determination requirement is not satisfied at step 100 (PMsm>BUpm), the process proceeds to step 110. At step 110, whether the estimated collection amount PMsm has been corrected in the current catalyst-regeneration control mode is determined (whether there is a history of correction). The correction of the estimated collection amount PMsm will be discussed below. If the outcome of step S110 is negative (no history of correction), the process proceeds to step 120, where the normal catalyst regeneration is executed. As described above, in the normal catalyst regeneration, fuel addition from the fuel adding valve 31 is repeated in a state where the air-fuel ratio is higher than the stoichiometric air-fuel ratio. In step 120, the catalyst temperature is increased (for example, 600 to 700° C.), so that particulate matter collected by the second catalytic converter 33 is burned and removed. As a result, the second catalytic converter 33 is regenerated. Accordingly, the oxidation amount PMc in the formula (1) exceeds the engine discharging amount PMe (PMe<PMc), and the estimated collection amount PMsm is gradually decreased. After step 120 is completed, the catalyst regeneration control routine is temporarily suspended.

As the estimated collection amount PMsm is gradually decreased, the outcome of step 100 becomes positive (PMsm≦BUpm). That is, the requirement for shifting from the normal catalyst regeneration to the burn-up catalyst regeneration is satisfied, and the process proceeds to step 130. At step 130, it is determined which one of the first and second burn-up catalyst regeneration should be executed. The determination is performed by comparing the pressure difference ΔP and the determination value Dp with each other. In this embodiment, the pressure difference ΔP is not used without changing. Instead, the ratio of the pressure difference ΔP and the intake air amount GA, a value ΔP/GA, is used. The reason why the ratio is used is to eliminate the influence of the intake air amount GA to the pressure difference ΔP. That is, as the intake air amount GA increases, the pressure loss at the second catalytic converter 33 is increased, and the pressure difference ΔP is increased, accordingly. Therefore, by using the value ΔP/GA that is divided the pressure difference ΔP by the intake air amount GA, the comparison is accurately performed regardless of the intake air amount GA. In this embodiment, the determination value Dp has a constant value.

It is more appropriate if the intake air amount GA is changed to the exhaust flow rate, and a value that is obtained by dividing the pressure difference ΔP by the exhaust flow rate is compared with the determination value Dp. However, since the intake air amount GA is in direct proportion to the exhaust flow rate, using the value ΔP/GA does not adversely affect the accuracy.

If the outcome of step 130 is positive, or the formula ΔP/GA≧Dp is satisfied, it is assumed that the amount of particulate matter PM remaining unburned in the second catalytic converter 33 is relatively large. In this case, the first burn-up catalyst regeneration is executed in steps 140 to 160. Specifically, at step 140, it is determined whether the number of corrections of the estimated collection amount PMsm in the first burn-up catalytic regeneration is no more than a predetermined stopping determination number Np (for example, two times). When the outcome of step 140 is positive, the process proceeds to step 150, where a predetermined increase conversion value UPpm is substituted into the estimated collection amount PMsm. That is, the estimated collection amount PMsm is corrected. The increase conversion value UPpm is a constant value that is greater than the shifting determination value BUpm. In this manner, the estimated collection amount PMsm, which is at first no more than the shifting determination value BUpm, is increased to the increase conversion value UPpm, which is greater than the shifting determination value BUpm. Then, at step 160, the first burn-up catalyst regeneration is performed based on the estimated collection amount PMsm, which has been corrected. That is, a fuel supply cycle is executed, which includes the supplying period and supply stopping period. In other words, the fuel adding valve 31 is controlled to intermittently supply unburned fuel to the exhaust passage 14. As unburned fuel is intermittently supplied, deposits on the upstream end of the first catalytic converter 32 and particulate matter PM collected by the second catalytic converter 33 are both burned and removed.

After step 160, whether the estimated collection amount PMsm is greater than the end determination value PMend at step 170 is determined. If the outcome of step 170 is negative 30 (PMsm≦PMend), the first burn-up catalyst regeneration) is ended at step 180. Thereafter, the catalyst regeneration control routine is temporarily suspended. In contrast, if the outcome of step 170 is positive (PMsm>PMend), the catalyst regeneration control routine is temporarily suspended.

If the estimated collection amount PMsm is greater than the shifting determination value BUpm due to correction at step 150, and the estimated collection amount PMsm is greater than the shifting determination value BUpm after the first burn-up catalyst regeneration at step 160, the outcome of step 100 will be negative in a subsequent execution of the catalyst regeneration control routine. However, the outcome of step 110 will be positive. In such a case, the process proceeds to step 160, where the first burn-up catalyst regeneration is executed. After step 160, step 170 is executed and the process proceeds to the return. Alternatively, the process proceeds to the return after steps 170 and 180 are executed.

If the estimated collection amount PMsm has dropped to a value no more than the shifting determination value BUpm due to the first burn-up catalyst regeneration of step 160 in the previous execution, steps 130 to 180 are executed. In the course of these steps, the increase conversion value UPpm is again substituted into the estimated accumulation value PMsm, and the first burn-up catalyst regeneration is executed. In this manner, the estimated collection amount PMsm is corrected, so that the amount of supplied unburned fuel is slightly more than the amount required for completely burning particulate matter PM remaining unburned in the second catalytic converter 33.

However, correction of the estimated collection amount PMsm at step 150 is not executed for a number of times greater than the stopping determination number Np. This is because the process does not proceed to step 150 when the outcome of step 140 is negative. In such a case (negative outcome at step 140), the process proceeds to step 160 without executing step 150 (correction of the estimated collection amount PMsm), and the first burn-up catalyst regeneration is executed. Steps from step 160 are the same as those described above.

In contrast, when the outcome of step 130 is not positive (ΔP/GA<Dp), it is assumed that a relatively small amount of particulate matter PM is remaining unburned in the second catalytic converter 33. In such a case, it is determined at step 190 whether a condition is met that there is no history of execution of the first burn-up catalyst regeneration in the current catalyst regeneration control mode. If the outcome is positive (there is no history of execution), the second burn-up catalyst regeneration is executed at step 200. That is, by executing the fuel supply cycle including the supplying period and stopping period for a predetermined number of times (for example, three times), a predetermined amount of unburned fuel is intermittently supplied from the fuel adding valve 31 to the exhaust passage 14 regardless of the amount of particulate matter PM remaining unburned in the second catalytic converter 33. As unburned fuel is intermittently supplied, deposits on the upstream end of the first catalytic converter 32 and particulate matter PM collected by the second catalytic converter 33 are both burned and removed. The number of executions of the fuel supply cycle is limited in the second burn-up catalyst regeneration to prevent the supply of unburned fuel from being continued unnecessarily.

After step 200, the second burn-up catalyst regeneration is ended at step 180, and the catalyst regeneration control routine is temporarily suspended. When the outcome of step 190 is negative, that is, when there is a history indicating that the first burn-up catalyst regeneration has been executed in the current catalyst regeneration control mode, the process proceeds to step 160.

In the catalyst regeneration control routine, step 100 executed by the electronic control unit 41 corresponds to a process executed by a determining section, which determines whether particulate matter in the collector has been burned and removed. Steps 160 and 200 executed by the electronic control unit 41 correspond to a process executed by a controlling section, which causes the fuel supplying device to supply unburned fuel to the exhaust passage after the determining section determines that particulate matter in the collector has been burned and removed. Step 130 executed by the electronic control unit 41 corresponds to a process executed by a comparing section, which compares a predetermined value with the difference between the exhaust pressures detected by the detecting section at a point in time when the determining section determines that particulate matter in the collector has been burned and removed.

Figure 4:
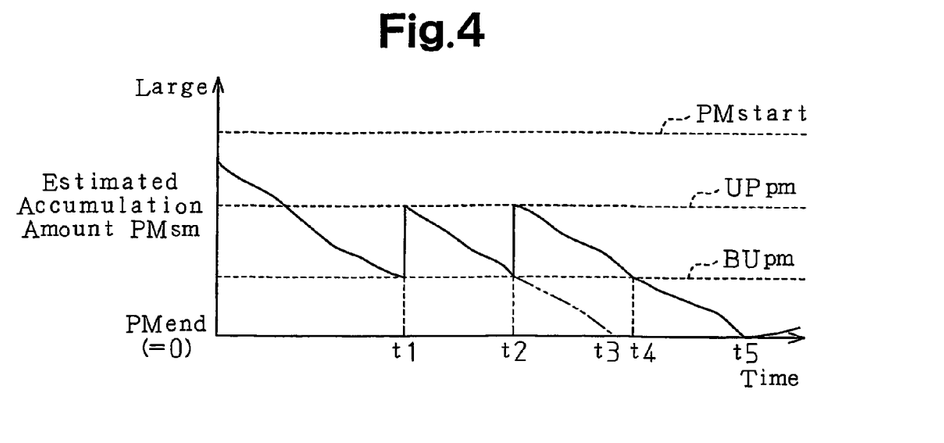
FIG. 4 is a time chart showing changes in an estimated collection amount PMsm.

As each step is executed according to the catalyst regeneration control routine, the estimated collection amount PMsm is changed, for example, as shown in FIG. 4 after the normal catalyst regeneration is started. If the estimated collection amount PMsm is more than the shifting determination value BUpm and there is no history of correction to the estimated collection amount PMsm before time t1, the process of the catalyst regeneration control routine is executed in the order of steps 100, 110, 120, and then returns. That is, the normal catalyst regeneration is executed. Unburned fuel is continuously added to exhaust gas from the fuel adding valve 31, so that particulate matter PM remaining unburned in the second catalytic converter 33 is burned, and the estimated collection amount PMsm is reduced.

Accordingly, the estimated collection amount PMsm drops to the shifting determination value BUpm at time t1 and the outcome of step 100 becomes positive. Then, step 130 and the subsequent steps are executed in a subsequent execution of the catalyst regeneration control routine. At this time, if there is a relatively great amount of particulate matter PM remaining in the second catalytic converter 33, and the value ΔP/GA is no less than the determination value Dp, the process is executed in the order of steps 130, 140, 150, 160, 170, and then returns. In the course of these steps, the estimated collection amount PMsm, which has temporarily been reduced to the shifting determination value BUpm, is increased to the increase conversion value UPpm, which is greater than the shifting determination value BUpm. Then, based on the estimated collection amount PMsm, which has been increased, the first burn-up catalyst regeneration is executed. Unburned fuel is intermittently added to the exhaust gas by the fuel adding valve 31, so that the temperatures of the first catalytic converter 32 and the second catalytic converter 33 are increased to burn deposits on the upstream end of the first catalytic converter 32 and particulate matter PM remaining in the second catalytic converter 33. Therefore, the estimated collection amount PMsm is decreased again.

Because of execution of step 150, the outcome of step 100 will be negative in the catalyst regeneration control routine executed after time t1. In such a case, since the outcome of step 110 is positive, the process is executed in the order of steps 100, 110, 160, 170, and then returns. Therefore, after time t1, the estimated collection amount PMsm, which has been increased to the increase conversion value UPpm, will be reduced.

When the estimated collection amount PMsm drops to the shifting determination value BUpm at time t2 and the outcome of step 100 becomes positive again, step 130 and the subsequent steps are executed in a subsequent execution of the catalyst regeneration control routine. At this time, if there is little amount of particulate matter PM remaining in the second catalytic converter 33, and the value ΔP/GA is less than the determination value Dp, the process is executed in the order of steps 130, 190, 160, 170, and then returns. In this case, the estimated collection amount PMsm is not corrected, and the estimated collection amount PMsm is further reduced from the shifting determination value BUpm as indicated by alternate long and two short-dashes line in FIG. 4. When the outcome of step 170 becomes positive at time t3, the process is executed in the order of steps 170, 180, and then returns, and the second burn-up catalyst regeneration is ended.

In contrast, at a point in time t2 when the outcome of step 100 is positive, if there is a relatively great amount of particulate matter PM remaining in the second catalytic converter 33, and the value ΔP/GA is no less than the determination value Dp, the process is executed in the same order as in the period from time t1 to time t2 as described above. As a result, the estimated collection amount PMsm is increased to the increase conversion value UPpm at time t2 as indicated by a solid line. Thereafter, the estimated collection amount PMsm is decreased.

At a point in time t4 when the outcome of step 100 is positive, even if the value ΔP/GA is no less than the determination value Dp, the outcome of step 140 is negative due to the past corrections the number of times of which is Np. Therefore, in this case, the process is executed in the order of steps 140, 160, 170, and then returns, and the estimated collection amount PMsm is not corrected. The estimated collection amount PMsm continues being decreased after time t4. When the outcome of step 170 becomes positive at time t5, the process is executed in the order of steps 170, 180, and then returns, and the first burn-up catalyst regeneration is ended.

The embodiment described above provides the following advantages.

(1) Unburned fuel, which is supplied to exhaust gas for burning and removing particulate matter PM, is likely to collect on the upstream end of the first catalytic converter 32. Since it is difficult to completely burn the collected unburned fuel, some unburned fuel remains as deposits. The deposits degrade the reactivity of the first catalytic converter 32, and causes particulate matter PM to remain unburned in the second catalytic converter 33.

In this embodiment, if it is determined that particulate matter PM in the second catalytic converter 33 has been burned and removed during regeneration of the second catalytic converter 33, unburned fuel continues being supplied thereafter. The supplied unburned fuel permits particulate matter PM remaining unburned in the second catalytic converter 33 to be completely burned and removed. Therefore, a drawback caused by particulate matter PM remaining unburned until the subsequent regeneration of the second catalytic converter 33 is eliminated. That is, in the subsequent regeneration, the temperature of the second catalytic converter 33 is prevented from being excessively increased by an abrupt burning of particulate matter PM.

(2) As particulate matter PM accumulates in the second catalytic converter 33, the collection amount of particulate matter PM is increased. On the other hand, as the amount of particulate matter PM that is burned and removed by the action of unburned fuel is increased, the collection amount of particulate matter PM is reduced. When the collection amount drops to zero, it is believed that the particulate matter PM collected by the second catalytic converter 33 has been completely burned.

In this embodiment, the collection amount of particulate matter in the second catalytic converter 33 (the estimated collection amount PMsm) is computed based on the operating state of the engine 10, and the estimated collection amount PMsm is compared with the shifting determination value Bupm, which is slightly greater than zero). If the estimated collection amount PMsm is no greater than the shifting determination value BUpm, it is predicted that particulate matter PM will soon be completely burned and removed.

(3) By intermittently supplying unburned fuel into exhaust passage 14 based on the fuel supply cycle, heat generated due to burning of unburned fuel supplied in the initial supplying period is consumed to increase the temperature of the upstream end of the first catalytic converter 32, so that increase in the temperature of the second catalytic converter 33 is delayed accordingly. Therefore, as shown in FIG. 2(C), the temperature of the first catalytic converter 32 is temporarily higher than the temperature of the second catalytic converter 33 immediately after the supplying period in the initial fuel supply cycle. Then, by repeating the fuel supply cycle, the temperature distribution is in the state shown in FIG. 2(D), in which the temperature is about the same all through the first and second catalytic converters 32 and 33 both in the upstream and downstream directions. As a result, the deposits in the first catalytic converter 32 and particulate matter PM remaining unburned in the second catalytic converter 33 are both burned and removed, while preventing the second catalytic converter 33 from being degraded by heat. In contrast to this, if the amount of supplied unburned fuel is simply increased, the temperature at the upstream end of the first catalytic converter 32 is increased, so that deposit can be removed. However, temperature in a section downstream of the upstream end is excessively increased, and as a result, the second catalytic converter 33 can be degraded by the heat.

(4) When it is determined that particulate matter PM in the second catalytic converter 33 has been burned and removed (positive outcome at step 100), the value ΔP/GA and the determination value Dp is compared. According to the result of the comparison, the manner for supplying unburned fuel to the exhaust passage 14 is switched. Therefore, compared to a case where unburned fuel is supplied to the exhaust passage 14 in a single manner, particulate matter PM is removed in a manner in correspondence with the amount of particulate matter PM remaining unburned in the second catalytic converter 33.

(5) In connection with item (4) above, when the ΔP/GA≧DP is satisfied (positive outcome at step 130), a certain amount of particulate matter PM is believed to be remaining in the second catalytic converter 33 after it is determined that particulate matter PM in the second catalytic converter 33 has been burned and removed. In this case, the first burn-up regeneration (step 160) is performed so that unburned fuel is supplied the amount of which is slightly more than the amount required for completely burning particulate matter PM remaining in the second catalytic converter 33. Put in different terms, supply of unburned fuel is continued for a period slightly longer than the duration of the fuel supply cycle for completely burning particulate matter PM remaining in the second catalytic converter 33. The supplied unburned fuel permits particulate matter PM remaining in the second catalytic converter 33 to be reliably burned and removed.

(6) On the other hand, when the inequality ΔP/GA<DP is satisfied (negative outcome at step 130), a small amount of particulate matter PM is believed to be remaining in the second catalytic converter 33 after it is determined that particulate matter PM in the second catalytic converter 33 has been burned and removed. In this case, the second burn-up catalyst regeneration (step 200) is executed so that a predetermined amount of unburned fuel is supplied regardless of the amount of the remaining particulate matter PM. The supplied unburned fuel permits particulate matter PM remaining in the second catalytic converter 33 to be burned and removed.

(7) In the second burn-up catalyst regeneration (step 200), the number of times the fuel supply cycle is executed is limited to a predetermined number (for example, three times). Therefore, the amount of supplied unburned fuel is limited, so that unnecessary continuation of supply of unburned fuel does not degrade the fuel economy.

The present invention may be embodied in the following forms.

The present invention may be applied to engines other than diesel engines. For example, the present invention may be applied to a lean combustion gasoline engine if the engine has a catalyst system similar to the system described herein.

Figure 5:
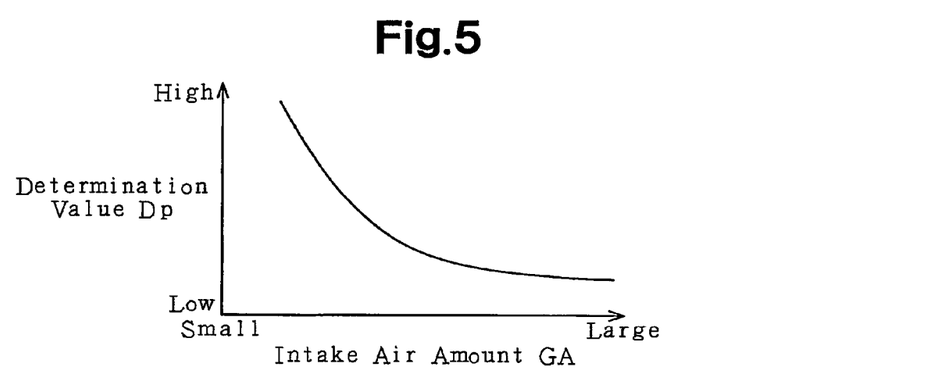
FIG. 5 is a graph showing a map for determining a determination value Dp in an alternate embodiment.

Instead of using a constant value for the determination value Dp at step 130 of FIG. 3, a variable value may be used. In this case, a map that defines the relationship between the intake air amount GA and the determination value Dp as shown in FIG. 5 may be used. In this map, the determination value Dp is small in a region where the intake air amount GA is great, and increased as the intake air amount GA is reduced. This is because the detection accuracy of the air flowmeter 16 can deteriorate as the intake air amount GA is reduced. Therefore, by using the determination value Dp obtained from the map, erroneous detection is prevented.

As the process of step 150 in FIG. 3, the estimated collection amount PMsm may be corrected in a manner different from the one described above. For example, an amount that is varied in accordance with the amount of particulate matter PM remaining unburned is substituted into the estimated collection amount PMsm.

Figure 6:
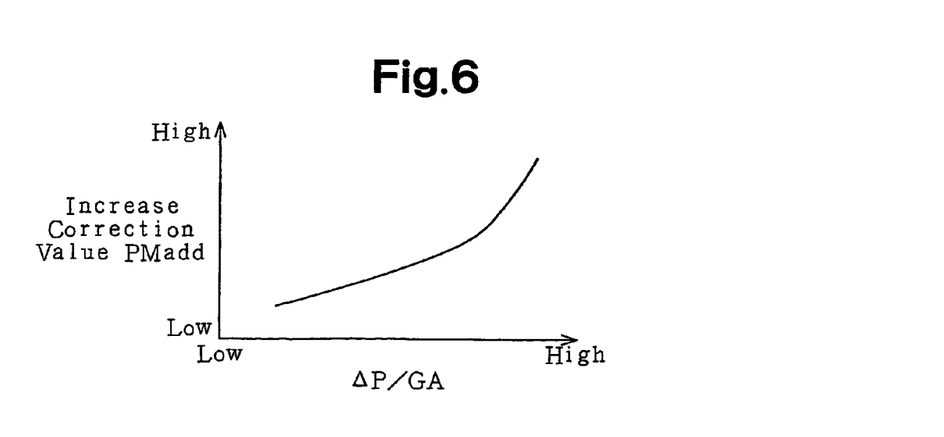
FIG. 6 is a graph showing a map for determining an increase correction value PMadd in another embodiment.

The value ΔP/GA is a substitute for the collection amount of particulate matter PM estimated based on pressure. The greater the value ΔP/GA, the greater becomes the collection amount of particulate matter PM. Therefore, if a value for correcting the estimated collection amount PMsm is an increase correction value PMadd, the increase correction value PMadd may be increased as the value ΔP/GA is increased as shown in FIG. 6. At step 150, the increase correction value PMadd is added to the estimated accumulation amount PMsm of the previous cycle, and the resultant is set as the (current) estimated collection amount PMsm. The estimated collection amount PMsm thus obtained is closer to the actual collection amount.

Instead of comparing the value ΔP/GA with the determination value Dp at step 130 of FIG. 3, the pressure difference ΔP may be compared with a value that is increased as the exhaust flow rate (or the intake air amount GA) is increased. For example, the pressure difference ΔP may be compared with the product of the determination value Dp and the intake air amount GA.

The present invention may be applied to an exhaust purifying apparatus in which no first catalytic converter 32 is provided in a section upstream of a second catalytic converter 33. In this case, unburned fuel collects on the upstream end of the second catalytic converter 33 and remains as deposits. The deposits cause the particulate matter PM to remain unburned in the second catalytic converter 33. However, as in the above described embodiment, burn-up catalyst regeneration is performed after it is determined that particulate matter in the second catalytic converter 33 has been burned and removed, so that particulate matter PM remaining unburned in the second catalytic converter 33 is completely burned and removed.

In the exhaust purifying apparatus, as the accumulation of particulate matter PM is increased in the second catalytic converter 33, the accumulated particulate matter PM hinders the flow of exhaust gas, or increases the flow resistance of exhaust gas. Accordingly, the pressure difference ΔP between the exhaust pressure upstream of the second catalytic converter 33 and the exhaust pressure downstream of the second catalytic converter 33 in the exhaust passage 14 is increased. The pressure difference ΔP is reduced as burning and removal of particulate matter PM by unburned fuel progress, and the amount of accumulated particulate matter PM in the second catalytic converter 33 is reduced. In this respect, the pressure difference ΔP, instead of using the estimated collection amount PMsm, may be used for determining that particulate matter PM in the second catalytic converter 33 has been burned and removed. In this case, the pressure difference ΔP is compared with a predetermined value, and the burning and removal of particulate matter PM are determined to have been completed when the pressure difference ΔP is less than the predetermined value.

Further, the completion of burning and removal of particulate matter PM in the second catalytic converter 33 may be determined based on both of the estimated collection amount PMsm and the pressure difference ΔP.

In the second burn-up catalyst regeneration (step 200), the number of times the fuel supply cycle is executed may be changed according to the pressure difference ΔP.

The present examples and embodiments are to be considered as illustrative and not restrictive and the invention is not to be limited to the details given herein, but may be modified within the scope and equivalence of the appended claims.

The invention claimed is:

1. An exhaust purifying apparatus for an internal combustion engine, comprising:
   a collector that is located in an exhaust passage of the internal combustion engine and collects particulate matter in exhaust gas;
   a fuel supplying device that supplies unburned fuel to the exhaust passage to burn and remove particulate matter collected by the collector, thereby regenerating the collector;
   a determining section that determines whether particulate matter in the collector has been burned and removed;
   a controlling section that causes the fuel supplying device to supply unburned fuel to the exhaust passage after the determining section determines that particulate matter in the collector has been burned and removed;
   a detecting section that detects a pressure difference between the exhaust pressure in a section of the exhaust passage that is upstream of the collector and the exhaust pressure in a section of the exhaust passage that is downstream of the collector, wherein the determining section determines that particulate matter in the collector has been burned and removed based on the exhaust pressure difference detected by the detecting section; and
   a comparing section that compares a predetermined value with an exhaust pressure difference that is detected by the detecting section at a point in time when the determining section determines that particulate matter in the collector has been burned and removed, wherein the controlling section switches the manner in which the fuel supplying device supplies unburned fuel to the exhaust passage according to the result of comparison by the comparing section,
   wherein, when the comparing section determines that the exhaust pressured difference is equal to or greater than a predetermined value, the controlling section causes the fuel supplying device to supply unburned fuel to the exhaust passage, the amount of which supplied unburned fuel is more than the amount required for completely burning particulate matter remaining unburned in the collector, and wherein, when the comparing section determines that the exhaust pressured difference is less than the predetermined value, the controlling section causes the fuel supplying device to supply a predetermined amount of unburned fuel to the exhaust passage regardless of the amount of particulate matter remaining unburned in the collector.

2. The apparatus according to claim 1, comprising an estimating section that estimates the amount of particulate matter in the collector based on the operating condition of the engine,
   wherein the determining section determines that particulate matter in the collector has been burned and removed based on the amount of particulate matter in the collector estimated by the estimating section.

3. The apparatus according to claim 1, comprising an exhaust purifying catalyst located in a section of the exhaust passage that is upstream of the collector, wherein the fuel supplying device supplies unburned fuel to a section of the exhaust passage that is upstream of the exhaust purifying catalyst.

4. The apparatus according to claim 1, wherein the controlling section causes the fuel supplying device to intermittently supply unburned fuel to the exhaust passage according to a fuel supply cycle that includes a period in which supply of unburned fuel is executed and a period in which supply of unburned fuel is not executed.

5. An exhaust purifying apparatus for an internal combustion engine, comprising:
   a collector that is located in an exhaust passage of the internal combustion engine and collects particulate matter in exhaust gas;

a fuel supplying device that supplies unburned fuel to the exhaust passage to burn and remove particulate matter collected by the collector, thereby regenerating the collector;

a determining section that determines whether particulate matter in the collector has been burned and removed;

a controlling section that causes the fuel supplying device to supply unburned fuel to the exhaust passage after the determining section determines that particulate matter in the collector has been burned and removed;

a detecting section that detects a pressure difference between the exhaust pressure in a section of the exhaust passage that is upstream of the collector and the exhaust pressure in a section of the exhaust passage that is downstream of the collector, wherein the determining section determines that particulate matter in the collector has been burned and removed based on the exhaust pressure difference detected by the detecting section; and a comparing section that compares a predetermined value with an exhaust pressure difference that is detected by the detecting section at a point in time when the determining section determines that particulate matter in the collector has been burned and removed, wherein the controlling section switches the manner in which the fuel supplying device supplies unburned fuel to the exhaust passage according to the result of comparison by the comparing section, wherein, when the comparing section determines that the exhaust pressured difference is equal to or greater than a predetermined value, the controlling section causes the fuel supplying device to supply unburned fuel to the exhaust passage during a period that is longer than the period required for completely burning particulate matter remaining unburned in the collector, and wherein, when the comparing section determines that the exhaust pressured difference is less than the predetermined value, the controlling section causes the fuel supplying device to supply unburned fuel to the exhaust passage during a predetermined period regardless of the amount of particulate matter remaining unburned in the collector.

6. An exhaust purifying apparatus for an internal combustion engine, comprising:

a collector that is located in an exhaust passage of the internal combustion engine and collects particulate matter in exhaust gas;

a fuel supplying device that supplies unburned fuel to the exhaust passage to burn and remove particulate matter collected by the collector, thereby regenerating the collector;

a determining section that determines whether particulate matter in the collector has been burned and removed;

a controlling section that causes the fuel supplying device to supply unburned fuel to the exhaust passage after the determining section determines that particulate matter in the collector has been burned and removed;

a detecting section that detects a pressure difference between the exhaust pressure in a section of the exhaust passage that is upstream of the collector and the exhaust pressure in a section of the exhaust passage that is downstream of the collector, and a comparing section that compares a predetermined value with an exhaust pressure difference that is detected by the detecting section at a point in time when the determining section determines that particulate matter in the collector has been burned and removed, wherein the controlling section switches the manner in which the fuel supplying device supplies unburned fuel to the exhaust passage according to the result of comparison by the comparing section, wherein, when the comparing section determines that the exhaust pressured difference is equal to or greater than a predetermined value, the controlling section causes the fuel supplying device to supply unburned fuel to the exhaust passage, the amount of which supplied unburned fuel is more than the amount required for completely burning particulate matter remaining unburned in the collector, and wherein, when the comparing section determines that the exhaust pressured difference is less than the predetermined value, the controlling section causes the fuel supplying device to supply a predetermined amount of unburned fuel to the exhaust passage regardless of the amount of particulate matter remaining unburned in the collector.

7. An exhaust purifying apparatus for an internal combustion engine, comprising: a collector that is located in an exhaust passage of the internal combustion engine and collects particulate matter in exhaust gas;

a fuel supplying device that supplies unburned fuel to the exhaust passage to burn and remove particulate matter collected by the collector, thereby regenerating the collector;

a determining section that determines whether particulate matter in the collector has been burned and removed;

a controlling section that causes the fuel supplying device to supply unburned fuel to the exhaust passage after the determining section determines that particulate matter in the collector has been burned and removed;

a detecting section that detects a pressure difference between the exhaust pressure in a section of the exhaust passage that is upstream of the collector and the exhaust pressure in a section of the exhaust passage that is downstream of the collector, and a comparing section that compares a predetermined value with an exhaust pressure difference that is detected by the detecting section at a point in time when the determining section determines that particulate matter in the collector has been burned and removed, wherein the controlling section switches the manner in which the fuel supplying device supplies unburned fuel to the exhaust passage according to the result of comparison by the comparing section, wherein, when the comparing section determines that the exhaust pressured difference is equal to or greater than a predetermined value, the controlling section causes the fuel supplying device to supply unburned fuel to the exhaust passage during a period that is longer than the period required for completely burning particulate matter remaining unburned in the collector, and wherein, when the comparing section determines that the exhaust pressured difference is less than the predetermined value, the controlling section causes the fuel supplying device to supply unburned fuel to the exhaust passage during a predetermined period regardless of the amount of particulate matter remaining unburned in the collector.

* * * * *